United States Patent
Bible, Jr. et al.

(10) Patent No.: US 6,873,976 B2
(45) Date of Patent: Mar. 29, 2005

(54) SECURED PURCHASING SYSTEM

(75) Inventors: Robert Bible, Jr., Rancho Santa Fe, CA (US); Mark Steven Burnett, La Jolla, CA (US)

(73) Assignee: 900Pennies Incorporated, San Diego, CA (US)

( * ) Notice: Subject to any disclaimer, the term of this patent is extended or adjusted under 35 U.S.C. 154(b) by 536 days.

(21) Appl. No.: 09/925,147

(22) Filed: Aug. 8, 2001

(65) Prior Publication Data

US 2002/0069171 A1 Jun. 6, 2002

Related U.S. Application Data

(63) Continuation-in-part of application No. 09/728,361, filed on Dec. 1, 2000.

(51) Int. Cl.[7] .............................................. G06F 17/60
(52) U.S. Cl. .............................. 705/51; 705/50; 705/52; 705/53; 705/57; 705/76; 705/78
(58) Field of Search ...................... 705/50–80; 713/150; 380/277

(56) References Cited

U.S. PATENT DOCUMENTS

| | | | |
|---|---|---|---|
| 5,537,585 A | 7/1996 | Blickenstaff | |
| 5,727,129 A | 3/1998 | Barrett | |
| 5,761,663 A | 6/1998 | Lagarde | |
| 5,768,528 A | 6/1998 | Stumm | |
| 5,832,522 A | 11/1998 | Blickenstaff | |
| 5,850,442 A | 12/1998 | Muftic | |
| 5,960,411 A | 9/1999 | Hartman | |
| 6,226,618 B1 * | 5/2001 | Downs et al. | 705/1 |
| 2002/0112171 A1 * | 8/2002 | Ginter et al. | 713/185 |
| 2003/0144963 A1 * | 7/2003 | Saito | 705/57 |

FOREIGN PATENT DOCUMENTS

WO    WO 00/14918    *    3/2000    ............ H04K/1/06

OTHER PUBLICATIONS

Faber et al., "The Secure Distribution of Digital Contents", 1997 IEEE.*

* cited by examiner

Primary Examiner—James P. Trammell
Assistant Examiner—Jalatee Worjloh
(74) Attorney, Agent, or Firm—Nydegger & Associates

(57) ABSTRACT

A system and method for transferring an encrypted file over the Internet involves a seller, a buyer, and a transaction agent. The file has a first part (administrative information) and a second part (subject-matter content) that are respectively encrypted with first and second encryption/decryption non-public keys. In operation, the appropriate key is released by the seller or the transaction agent for respective use by either the transaction agent or the buyer, to decrypt and reveal the second part of the file to the buyer.

14 Claims, 2 Drawing Sheets

SECURED PURCHASING SYSTEM

This application is a continuation-in-part of application Ser. No. 09/728,361 filed Dec. 1, 2000, which is currently pending. The contents of application Ser. No. 09/728,361 are incorporated herein by reference.

FIELD OF THE INVENTION

The present invention pertains generally to systems and methods for conducting secure commercial transactions in e-commerce on the internet. More particularly, the present invention pertains to systems and methods for encrypting a file before it is to be sold by a seller, and then revealing the file for subsequent use by a buyer. The present invention is particularly, but not exclusively, useful for conducting an Internet transaction wherein a predetermined combination of encryption/decryption keys are employed to encrypt and decrypt the content of the file.

BACKGROUND OF THE INVENTION

Artists, when they want to sell their work products, are like any other seller in a marketplace. They desire to be somehow compensated for their efforts. The work product of an artist, however, unlike many other kinds of work products, has value primarily because of the unique expression that is given to the particular work by the artist. Unfortunately, this expression is often susceptible to being copied. This is so regardless of the particular type of work product involved; whether it be a literary work, a musical work, a dramatic work, a pictorial work, an audiovisual work, a sound recording or a work in some other form.

An ever-present problem for the artist/author of a publishable work has been how best to offer the work to an audience. More specifically, the concern has been for how to offer the work product in a manner that will ensure the artist is appropriately compensated for his/her endeavors. Heretofore, many artists have relied on publishing houses in order to commercially offer their respective works to the public. This, of course, assumes the artist/author is able to interest the publishing house in the work product, and the publishing house determines the work product is commercially viable. If the work is published, the publishing houses have taken control over the marketing of the artist's work and, not surprisingly, have done so on terms favorable to the publishing house. In such arrangements, the artist's compensation has normally been in the form of royalties that are paid to the artist by the publishing house. Typically, these royalties have somehow been based on sales of the work in the marketplace. The marketplace as it was once known, however, has changed with the advent of the Internet.

As it has developed over recent years, the Internet provides a new and distinctive marketplace for an artist. Specifically, from the perspective of an artist/author, electronic publishing on the Internet provides a unique opportunity in at least two important respects. First, standard Web page publication tools are now available that enable an artist to individually prepare his/her own work product for publication on the Internet. Second, all or a part of the artist's published work product can be encrypted. Further, insofar as encryption is concerned, there are two types of keys that are useful for the purpose of protecting information. One type of key is a "public" key, the other is a "private" key.

In general, a "public" key involves a system for generating encrypted messages in which only the intended recipient can decode the messages. This will be so even though the encryption key is made public. More specifically, this "public" key is in two parts and includes an encryption key, as its first part, which can be used to encrypt, encode or otherwise alter a message. The second part of the "public" key is a decryption key that, in effect, is a secret counterpart of the encryption part of the public key. Importantly, only an intended recipient of the message can use the decryption key to decrypt, decode, restore or otherwise reveal the message. On the other hand, unlike the "public" key, a "private" key (sometimes referred to as a "local" key) involves a system for generating encrypted messages in which any recipient having the encryption key can also decode the messages. Private keys are generally well known in the pertinent art, and they can be either so-called "symmetric" keys or "asymmetric" keys.

It happens that "symmetric" private keys are far more widely used than are the "asymmetric" or "non-symmetric" type of private keys. This is so primarily because "asymmetric" keys require one key for encryption, and another key for decryption. "Symmetric" private keys, on the other hand, are characterized by the fact the same key can be used to both encrypt and decrypt a file or message. When using a "symmetric" key, the decryption operation may be the same as the encryption operation, or it may be different. For example, in the specific case wherein the encryption operation is the same as the decryption operation, two successive encryption operations will return a file or message to its original form. In any event, it is important to note that an encryption/decryption operation using a "symmetric" (i.e. non-public) key has a distinct advantage over the operation of a "public" key in that, in general, it is computationally relatively less expensive.

In light of the above, it is an object of the present invention to provide a system and method which allows an artist/author to publish an encrypted work using a predetermined combination of non-public encryption/decryption keys. Another object of the present invention is to require the decryption of a work, using one key, in a manner that enables the direct payment of compensation from the audience (buyer) to the artist (seller) in a secure and essentially instantaneous transaction. It is another object of the present invention to provide a system and method for decrypting an encrypted, two-part work (file) which allows the artist (seller) to publish works on the Internet using standard publication tools. Still another object of the present invention is to provide a system and method for decrypting an encrypted work in a manner that diminishes the economic incentive for copying the work. Another object of the present invention is to provide systems and methods for a secured commercial transaction that facilitate the sale of a work product on the Internet by allowing the artist (seller) to place his account number and price, together with the work product, in a single file that is functional beyond the control of the artist. Yet another object of the present invention is to provide a system and method for decrypting an encrypted work that is simple to implement, easy to use, and comparatively very cost effective.

SUMMARY OF THE PREFERRED EMBODIMENTS

In accordance with the present invention, a system and a method for conducting secured commercial transactions over the Internet involves a buyer, a seller, and a transaction agency. More specifically, the transaction agency facilitates and enables completion of a commercial transaction between the seller (artist) and the buyer (audience). In accordance with the present invention, the subject matter of this transaction can be information that is revealed and directly downloaded from the Internet by the buyer. Additionally, it can be an invoice which is evidence of a collateral transaction between the buyer and the seller or a document showing proof-of-payment. In any case, the concepts of the present invention are applicable.

The file that is created by the seller contains at least two mandatory parts. These are an overhead and a content. It should be noted, however, that the file may also contain a clear-text header as an optional third part. Importantly, the overhead part of the file is encrypted by the seller using a public key that is provided to the seller by the transaction agent. Thus, even though the overhead is encrypted by the seller, in accordance with the present invention only the transaction agent might be capable of decrypting or decoding the overhead. Alternatively, the overhead part of the file can be encrypted by the seller using a private, non-public key. If this is done, each seller will normally have his/her own unique, private, non-public key. Importantly, whenever a non-public key is used for this purpose in the system of the present invention, both the seller and the transaction agent will need to know the key. It will also happen that when non-public keys are being used by various sellers to encrypt their respective overheads and contents, several different non-public keys will likely be involved. Thus, the transaction agent will need to keep track of the keys, and may be required to use the clear-text header of each file to determine which particular private key is being used.

As contemplated for the present invention, the overhead of the file will include commercial material about the file, such as pricing and payment terms. Also, it may contain such information as the minimum allowed payment, the file name, and the seller's accounting identification. Further, the overhead may also contain the number of times the content may be decrypted, an expiration date, and the buyer's account identification in the event the file is intended for a single buyer. Most importantly, the overhead will also include a private key which must be used by a potential buyer to decrypt the content part of the file.

As implied above, in addition to the encryption of the overhead part of the file (using either a public key, or a non-public key), the content part of the file is also encrypted. The content part of the file, however, is encrypted using a private key. As contemplated for the present invention, the content part of the file will include the particular work or works being sold for value by the seller. Examples of the content part of the file include: books, documents, pamphlets, movies, songs, games, pictures, software, or passwords. Additionally, the content may also include such information as Internet search results, coupons, proof-of-purchase codes, passwords, private Internet URL's, and answers to questions.

It was noted above that not all of the file needs to be encrypted. Unlike either the overhead part of the file or the content part of the file, the header of the file can be in clear text and will not be encrypted. This, of course, is done to allow the potential buyer to see and evaluate information contained in the file. For this purpose, the header can include advertising and informational material about the content of the file, samples of the content and suggested prices, as well as informational material about the seller. Further, the header can include actual portions of the content of the file.

In the operation of the systems and methods of the present invention, the seller creates a file (header, overhead and content) that is presented on an Internet website or in some other marketing venue. For this presentation, the seller encrypts the content part of the file with a local key that is under the control of the seller. Also, the seller encrypts the overhead part of the file with a public key that is obtained by the seller from the transaction agency and is under the control of the transaction agency. Alternatively, the seller can encrypt the overhead part of the file using his/her own unique non-public (private) key. When this is done, it is important that the transaction agent also has the key that is being used by the seller. Further, it is important that the transaction agent also has the ability to distinguish the key that is being used by a particular seller from similar keys that are being used by other sellers. Recall, the overhead part of the file also includes the seller's private key that will subsequently be used to decrypt the content part of the file.

After the overhead and the content parts of the file have been encrypted, the seller then presents the clear text header of his/her file to the scrutiny of potential buyers in the marketplace. It is to be noted at this point that the seller presents the whole file to the marketplace. This includes, the header, the overhead and the content. Only the header, however, can be read even though the whole file is available to everyone. Further, in this condition, the file may be downloaded and traded without incurring any monetary transaction, and without revealing any content.

When a buyer has decided to purchase a particular content from the seller, the buyer will "click on" a link to the file (e.g. a logo at the website) to notify the transaction agency of his/her intention to purchase the file. The transaction agency will then decrypt the overhead part of the file that was encrypted with its public key (or a specific private key provided by the seller for this purpose) to reveal the seller's private key that will be used to decrypt the content of the file. This private key is then used to decrypt or decode the content part of the file. As envisioned by the present invention this decryption of the content can be accomplished either directly by the buyer, or it can be accomplished by the transaction agent who will then send the decrypted file to the buyer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
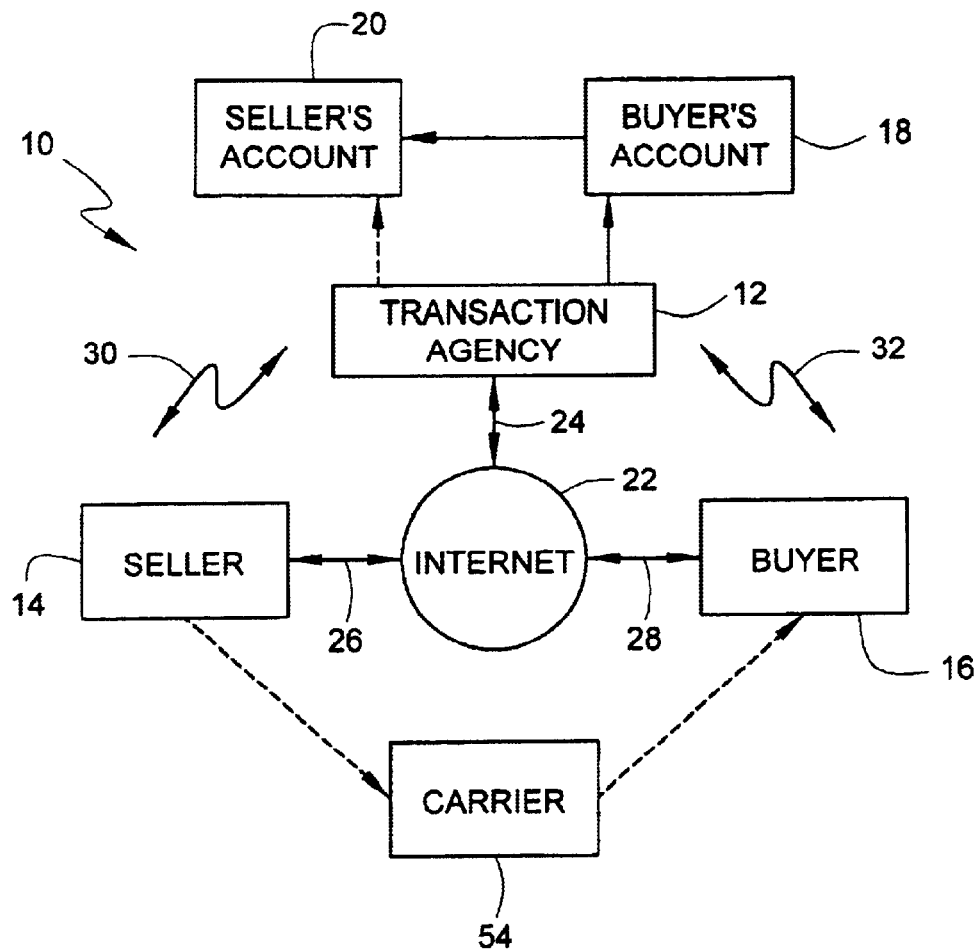
FIG. 1 is a schematic representation of the respective parties to a transaction that is accomplished in accordance with the present invention.

Referring initially to FIG. 1, a schematic representation of a transaction group, that includes the respective parties to a commercial transaction as it is to be accomplished in accordance with the present invention, is shown and is generally designated 10. As shown, the group 10 essentially includes a transaction agency 12, a seller 14 and an buyer 16. Further, it is indicated in FIG. 1 that the transaction agency 12 effectively controls a buyer's account 18, and a seller's account 20.

Still referring to FIG. 1, it is shown for a preferred embodiment of the present invention that each of the parties in the group 10 (i.e. transaction agency 12, seller 14 and buyer 16) are connected in communication with the Internet 22. These communication connections with the Internet 22 are respectively indicated in FIG. 1 by arrow 24 (transaction agency 12), arrow 26 (seller 14), and arrow 28 (buyer 16). It is envisioned for the present invention that, instead of using the Internet 22, communication between the various parties of group 10 can be conducted by other means well known in the pertinent art, such as by land line or wireless telephone connections. The arrow 30 between transaction agency 12 and the seller 14, as well as the arrow 32 between the transaction agency 12 and the buyer 16 are both exemplary of such connections.

Figure 2:
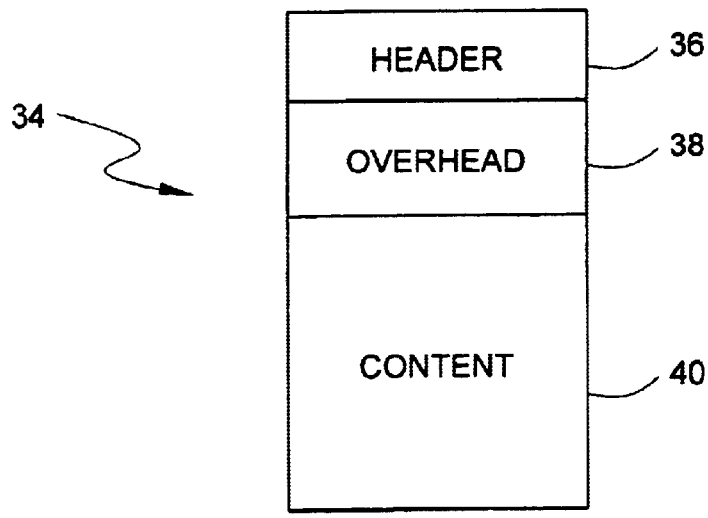
FIG. 2 is a schematic representation of the component parts of a file (object) that is published by an artist (seller) for a transaction that is to be accomplished in accordance with the methods of the present invention.

In FIG. 2, a representative schematic of a file (object) that is created by the seller 14 in accordance with the present invention, is shown and is generally designated 34. Specifically, the component parts of the file 34 are a header 36, an overhead 38 and a content 40. As envisioned for the present invention, the header 36 will include public material and will remain in clear text. Thus, the header 36 will not be encrypted and will be presented for perusal and consideration by a potential buyer 16. Further, using hyper-text markup language, (commonly known as HTML), the header 36 may be written to display fancy images or creative and colorful advertisement to the potential buyer 16. More specifically, the header 36 can include advertising and informational material about the seller 14 and his/her work product. For example, the header 36 can include the title of a work, its table of contents, an introduction to the work and, perhaps, even selected portions of the work. By way of further example, such selections may include portions of a poem, or the first thirty seconds of a song. In any event, as indicated above, it is envisioned that the header 36 will not be encrypted and will be presented in clear text for perusal and consideration by a potential buyer 16.

Unlike the header 36, both the overhead 38 and the content 40 of the file 34 are to be encrypted. Specifically, the overhead 38 is to be encrypted using either a public key or a private (non-public) key, and the content 40 is to be encrypted using a private key. Within the encrypted overhead 38 there will be general information about the pricing and payment terms that are established by the seller 14 for the conduct of the commercial transaction. Most importantly, the overhead 38 will include the private key that will eventually be used by a potential buyer 16 for decrypting the content 40. The content 40 of the file 34 will then include the actual work product that is being presented by the seller 14 for sale to the buyer 16. Recall, this all may be done on either the Internet 22 or in any other convenient marketing venue.

Figure 3:
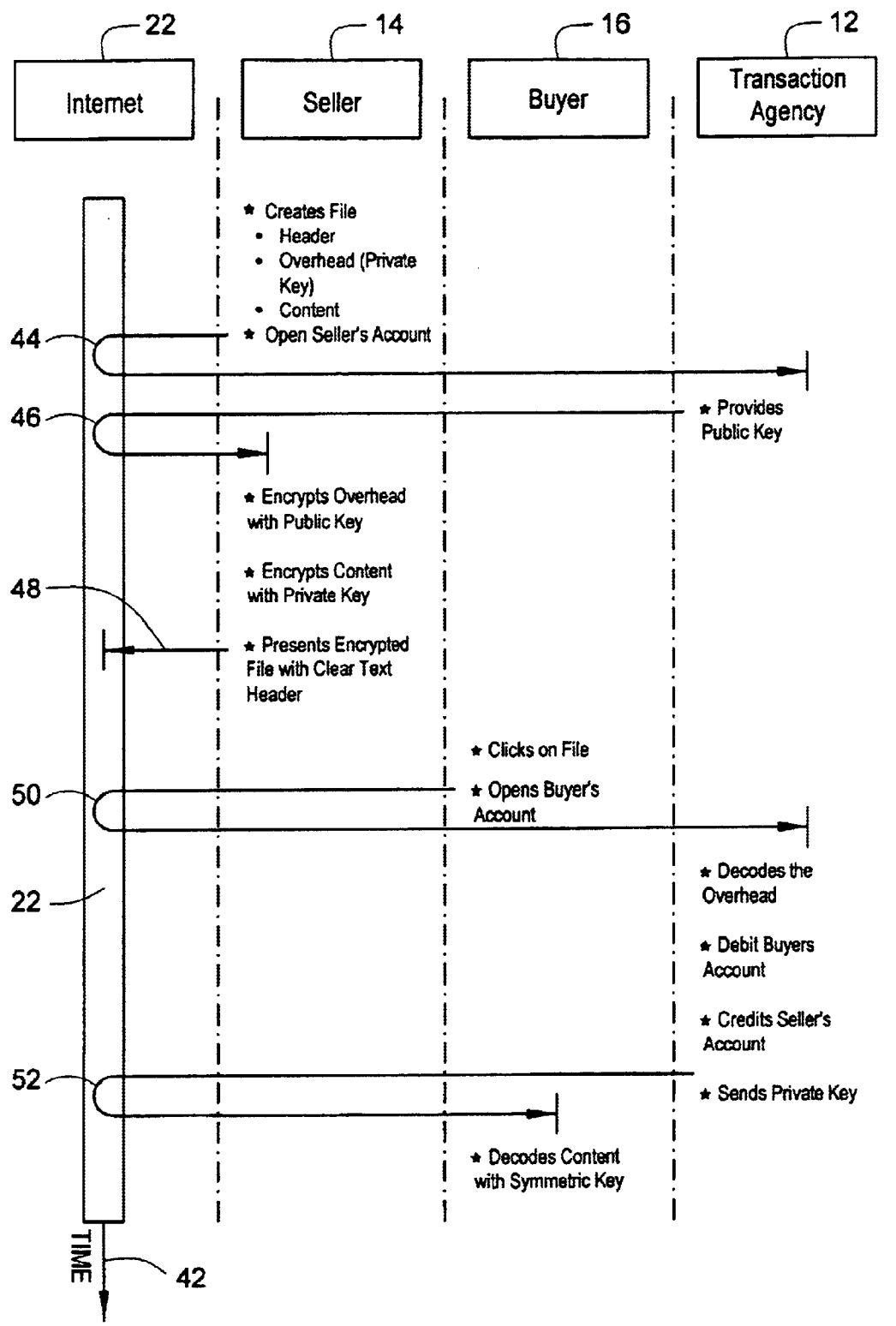
FIG. 3 is a time-line representation of the actions that are to be taken by participating parties during a transaction as it is to be accomplished in accordance with the methods of the present invention.

The actual operation of the methods and system of the present invention will be best appreciated with reference to FIG. 3. Specifically, FIG. 3 presents a time line 42 for the actions that are to be taken by the various parties of group 10 during a transaction in accordance with the present invention. As indicated in FIG. 3, it is first necessary for the seller 14 to create the file 34 (FIG. 2). Then, unless previously accomplished, the seller 14 will open the seller's account 20 with the transaction agency 12. This action is indicated in FIG. 3 by the arrow 44. When the seller's account 20 is opened, the seller 14 will receive administrative information from the transaction agency 12, and the transaction agency 12 will provide the seller 14 with a public key as indicated by the arrow 46. Recall, a "public" key is an encryption/decryption device for generating encrypted messages. The public key is unique, however, in that only the intended recipient can decode the messages. This will be so even though the encryption key is made public. For the present invention, the intended recipient is the transaction agency 12.

As an alternative to using a public key for encryption of the overhead 38, the present invention also envisions the use of a private (non-public) key for this purpose. More specifically, when the seller 14 chooses not to use a public key provided by the transaction agency 12, the seller 14 may use his/her own private (non-public) key to encrypt the overhead 38. It is important, however, that the transaction agency 12 knows when such a key is being used by the seller 14 for the overhead 38. Also, it is important that the transaction agency 12 have access to the key. Specifically, the transaction agency 12 and the seller 14 need to agree upon the use of a private (non-public) key prior to its use for encryption of the overhead 38. Moreover, if various sellers 14 are using private (non-public) keys to encrypt the overheads 38 of their respective files 34, it will be necessary that the transaction agency 12 have the ability to determine which particular private (non-public) key is being used for each particular overhead 38.

Upon receipt of the public key from the transaction agency 12, the seller 14 will then encrypt the file 34, if he/she has not already done so using a private (non-public) key. Specifically, the seller 14 will use the public key, or an agreed upon private (non-public) key, to encrypt the overhead 38. The seller 14, however, will use a private key to encrypt selected portions, or all, of the content 40. It is important to realize that, whenever a private (non-public) key is being used to encrypt the overhead 38, the private key that is subsequently used to encrypt the content 40 will most likely, but not necessarily, be a different key. In either case, the header 36 remains in clear text. As indicated by the arrow 48 in FIG. 3, the file 34 is then presented on the Internet 22 for possible purchase by a buyer 16.

Once the work product (e.g. file 34) of the seller 14 has been published and offered for sale on the Internet 22, the potential buyer 16 is able to peruse the clear-text header 36 to determine whether he/she desires to purchase the content 40. If so, the buyer 16 will "click on" the file 34, or they will otherwise manifest their intent to purchase the content 40 of file 34. At this time, unless earlier accomplished, the buyer 16 opens the buyer's account 18 with the transaction agency 12. This action is identified in FIG. 3 by the arrow 50 and it can be accomplished in any of several ways well known in the art, such as by telephone, written correspondence, or over the Internet 22. Subsequently, assuming that the buyer 16 has been successful in opening or establishing a viable buyer's account 18 with the transaction agency 12, several actions are taken by the transaction agency 12.

The time line 42 in FIG. 3 indicates that after a buyer 16 has indicated a desire to purchase the content 40 of file 34, the transaction agency 12 will then decode or decrypt the overhead 38. To do this, the transaction agency 12 uses the public key that was earlier provided to the seller 14 for encryption of the overhead 38. Recall, only the transaction agency 12 is capable of using the public key for decryption of the overhead 38. As also indicated above, when the overhead 38 has been encrypted using a private (non-public) key, in accordance with a prior arrangement between the transaction agency 12 and the seller 14, the transaction agency 12 will decode or decrypt the overhead 38 using the private (non-public) key. Thus, after decrypting the overhead 38, the transaction agency 12 can then send pricing and payment terms to the buyer 16 (indicated by arrow 52 in FIG. 3). The buyer 16 may then approve or cancel the transaction. Alternatively, the buyer 16 may forward a bid to the transaction agency 12 along with the overhead 38. If approved, the transaction agency 12 will debit the buyer's account 18 and credit the seller's account 20 with whatever value has been determined by the various parties of the transaction group 10 in their respective dealings with each other.

The final actions that will be taken to complete the transaction envisioned by the present invention, are to decrypt and reveal the content 40 of the file 34 to the buyer 16. This can be done in several ways. Preferably, once the transaction agency 12 has decoded the overhead 38 (which includes the private key that will be used to decode the content 40) the transaction agency 12 will transfer the private key to the buyer 16. The buyer 16 is then able to directly decode or decrypt the content 40 with the private key. Alternatively, after the buyer 16 has indicated his/her desire to purchase the content 40 of file 34, and the buyer's account 18 has been opened, the transaction agency 12 can decode or decrypt the content 40 of file 34. The decrypted content 40 will then be sent from the transaction agency 12 to the buyer 16. In yet another variation, instead of being the actual work product of the seller 14, the content 40 can be an invoice or a proof-of-payment code, to be presented to the seller 14, that is evidence of a collateral transfer of merchandise. In such a case, the work product of the seller 14 will, most likely, be transported to the buyer 16 by a carrier 54 (see FIG. 1).

While the particular Secured Purchasing System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for using a system to conduct encrypted commercial transactions with an encrypted file in e-commerce on the Internet which comprises the steps of:

creating said file, on the Internet, with said file having a first part and a second part;

encrypting said first part of said file with a first private key, wherein said first part of said file includes a second private key;

encrypting said second part of said file with said second private key;

decrypting said first part of said file with said first private key in response to a commercial transaction between a seller and a buyer;

retrieving said second private key from said first part; and decrypting said second part of said file with said second key to complete the transaction.

2. A method as recited in claim 1 further comprising the steps of:

presenting said file on the Internet, wherein said presenting step is accomplished by the seller;

selecting said file from the Internet, wherein said selecting step is accomplished by the buyer; and sending said first part of said file to a transaction agent for decrypting said second part of said file.

3. A method as recited in claim 2 wherein said commercial transaction is accomplished using the steps of:

debiting a buyers account for a predetermined amount by said transaction agent in response to said sending step; and crediting a seller's account with said predetermined amount by said transaction agent in response to said debiting step.

4. A method as recited in claim 1 wherein decrypting said first part requires a first operation and decrypting said second part requires a second operation.

5. A method as recited in claim 4 wherein said first operation is the same as said second operation.

6. A method as recited in claim 1 wherein said first private key and said second private key are provided by the seller.

7. A method as recited in claim 1 wherein said step of decrypting said first part is accomplished by said transaction agent.

8. A method as recited in claim 1 wherein said step of decrypting said second part is accomplished by the buyer.

9. A method as recited in claim 1 wherein said second part is a content, and further wherein said content includes work selected from a group consisting of books, documents, pamphlets, movies, songs, games, pictures and software.

10. A method for using a system to conduct encrypted commercial transactions between a buyer and a seller, wherein said method involves a transaction agent and comprises the step of:

presenting a file, said file being created, on the Internet, by the seller and containing at least an overhead and a content, with said overhead being encrypted with a first private key and said content being encrypted with a second private key; and decrypting said content of said file by employing said second private key to reveal said content of said file by employing said second private key to reveal said content of said file for use by the buyer to complete a commercial transaction between the buyer and the seller.

11. A method as recited in claim 10 wherein said presenting step is accomplished on an Internet.

12. A method as recited in claim 10 wherein said decrypting step is accomplished by the transaction agent.

13. A method as recited in claim 10 wherein said decrypting step is accomplished by the buyer.

14. A method as recited in claim 10 wherein said first private key is known to only the transaction agent and the seller for encrypting/decrypting said content of said file.

* * * * *